Aug. 25, 1970      J. R. HALE      3,525,663
ANTICLASTIC CELLULAR CORE STRUCTURE HAVING BIAXIAL
RECTILINEAR TRUSS PATTERNS
Filed March 9, 1967      3 Sheets-Sheet 1

INVENTOR.
JESSE R. HALE

BY Edward A. Schwiler

ATTORNEY

INVENTOR.
JESSE R. HALE

BY

ATTORNEY

Aug. 25, 1970     J. R. HALE     3,525,663
ANTICLASTIC CELLULAR CORE STRUCTURE HAVING BIAXIAL
RECTILINEAR TRUSS PATTERNS
Filed March 9, 1967     3 Sheets-Sheet 3
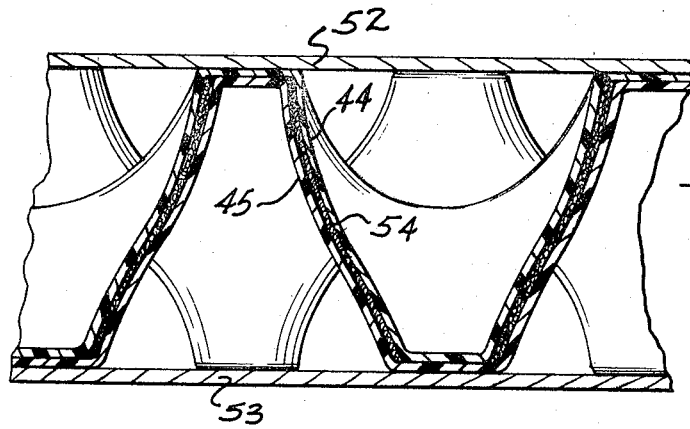
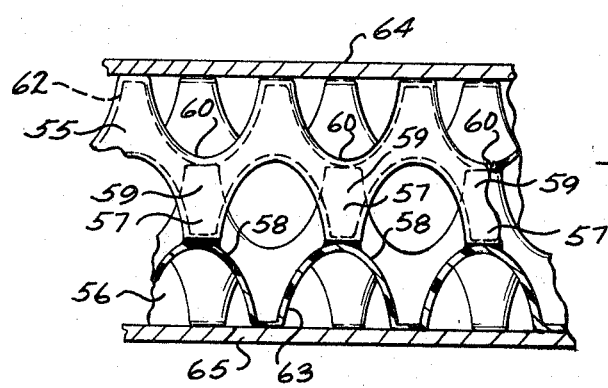
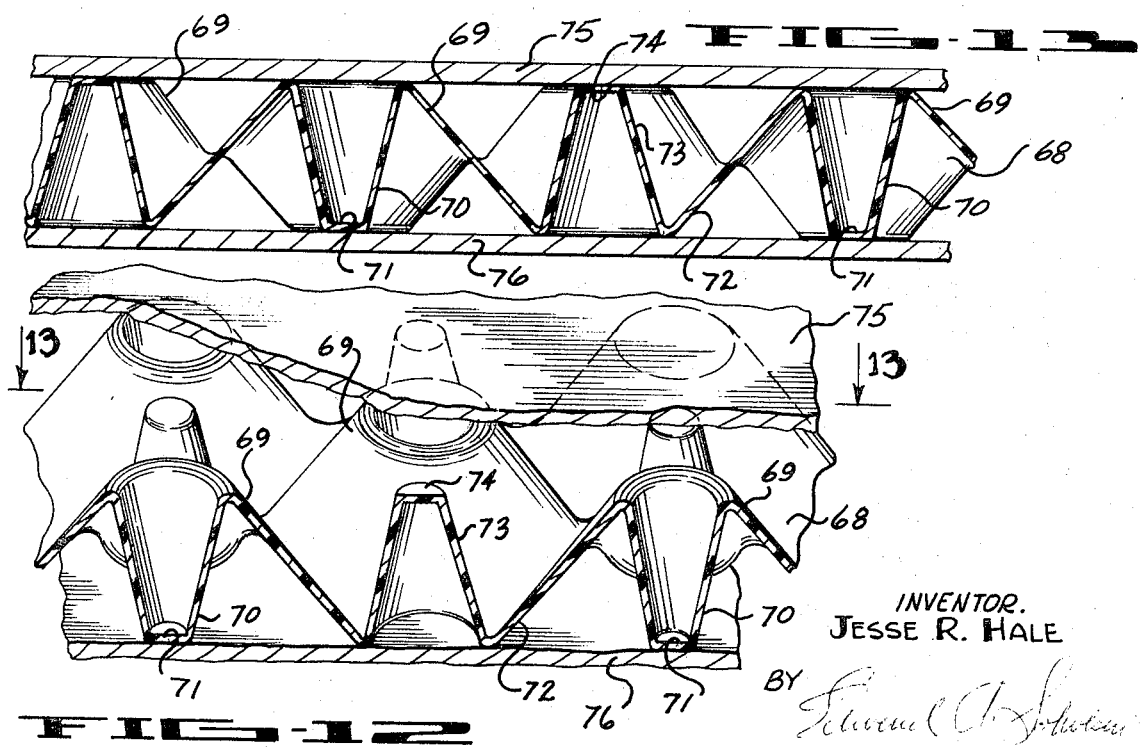
INVENTOR.
JESSE R. HALE
BY
ATTORNEY United States Patent Office 3,525,663
Patented Aug. 25, 1970

3,525,663
ANTICLASTIC CELLULAR CORE STRUCTURE HAVING BIAXIAL RECTILINEAR TRUSS PATTERNS
Jesse R. Hale, 14020 Budlong Ave., Gardena, Calif. 90247
Filed Mar. 9, 1967, Ser. No. 621,899
Int. Cl. B32b 3/28; E04c 2/32
U.S. Cl. 161—68          10 Claims

ABSTRACT OF THE DISCLOSURE

Anticlastic unitary structural membranes of essentially paraboloidal node form constructed of plastic, metal or other deformable material, have oppositely directed nodes which define opposite parallel bearing surfaces to which face sheets may be secured to form a structural sandwich. A pair of such membranes can be secured together, with or without inclusion therebetween of a compression material. These membranes can be made by heating and deforming a sheet between oppositely directed parallel pins or hollow cylinders in conjunction with pins.

This invention relates to an inexpensive lightweight cellular core material and to a method for producing it. More particularly it pertains to structural core material in the form of a unitary sheet of material having a plurality of essentially paraboloidal forms. The invention also relates to a structural core material composed of a plurality of anticlastic sheets having mating paraboloidal unitary struts, to sandwich structures produced thereby and to such structures which also incorpoorate compression materials within the plenum defined by adjacent structural sheets.

Prior art structural core materials are generally composed of balsa, polyurethane or other rigid or semi-rigid foams, space fameworks or other materials or structures which are intended to produce maximum strength-to-weight ratio structures at low cost. Such materials are variously used for the construction of structural building materials such as walls, floors and panels, boat hulls, aircraft structural forms, acoustical baffles and related products.

Balsa is a superlative core material in its optimum form. However, its wide variation in strength and density considerably reduces its reliability in use and substantially increases the cost of fabrication of sandwich panels. In addition its weight largely depends upon the amount of absorbed moisture.

Paper honeycomb, on the other hand, does not possess sufficiently high edge bearing capability for many applications. Furthermore, honeycomb requires utilization of fillet bonds to secure facing sheets or skins to the core with a resultant decrease in reliability and physical characteristics including fatigue resistance.

Other core materials such as those comprised of truss type space frameworks similarly require fillet bonding to sandwich face sheets and generally do not have the edge bearing capability of equivalent strength to weight structures. Many of these core materials are dependent in large measure on the bond to the face sheet or skin for structural integrity.

Among alternative core structures which have been proposed are deformed sheet members composed of a plurality of hyperbolic paraboloidal shaped projections. Core structures of this type possess highly advantageous characteristics including general uniformity of compressive strength, high strength-to-weight ratios and substantial rigidity. However, such core structures possess a major structural defect in the presence therein of straight line hinges; all lying within the topological Riemann zero plane or midlevel portion of the plane of structure. The result of this characteristic is that the compressive forces applied to oppositely adjacent nodes create bending moments about mid-level portion hinge lines. As a consequence, such structures do not have the rigidity or strength which can be achieved when the hinge lines of the structure do not all lie in the same plane. This undesired hinge effect is essentially a function of the hyperbolic paraboloidal forms defined by adjacent nodes. Of course, the hinge effect is partially reduced at the intersections of converging straight line hinges. Nevertheless, deformed core structures of hyperbolic paraboloid form do not possess optimum compression and flexural values.

An additional technique for eliminating the hinge effect is to make the dimensional relationship between the node diameters and the spacing therebetween and the depth to which the nodes are drawn such that any cross section running through the nodes in a plane parallel to the truss plane has an essentially rectilinear configuration.

It is therefore an object of my invention to provide a structural core of high strength-to-weight characteristic, possessing high flexural and shear strengths, and high edge bearing capability, and more particularly one in which the hinge effect is substantially reduced.

I also desire to furnish low cost structural cores which may be constructed in a wide variety of different forms to produce controlled physical properties.

It is also an object of my invention to provide an anticlastic membrane possessing superior acoustical properties.

Another object of my invention is to provide structural cores comprised of a plurality of mating anticlastic membranes having foam plastic or other material disposed between such membranes. Such structural cores have substantially increased strength-to-weight ratio characteristics and improved structural integrity.

A further object is to provide an anticlastic membrane sheet and foam composite structure which can be used as a controlled rate crushable structure and which exhibits improved acoustic and vibration dampening qualities when secured to a single face sheet.

It is also an object of my invention to provide lightweight, strong, low cost anticlastic membrane structures which can be formed along two axes into various curved shapes and which can then be bonded to rigid face sheet structures having substantial spacial integrity.

A further object of my invention is to furnish a lightweight, stable structural insulation panel.

Still a further object of my invention is to provide a simple low cost method for construction of light-weight panels having flexural and shear strength in all planes.

The invention is essentialy directed to the elimination or substantial reduction of the hinge effect in a unitary sheet having a plurality of oppositely disposed nodes by:

(1) So disposing the nodes that the face diameter of each node is at least equal to one-half of the distance between adjacent nodes, and stretched to a depth so as to create a straight line pattern in the plane of structure. As can be seen in FIGS. 4a and 4b the truss structure is such that any cross section running through the nodes in a plane parallel to the truss plane has an essentially rectilinear configuration.

(2) Varying the node size so that the face diameters of all similarly directed nodes are different from the face diameters of all oppositely directed nodes.

(3) Varying the node size so that the face diameters of adjacent similarly directed nodes are different.

(4) Forming a reduced diameter antinode in the face of each node.

(5) Securing pairs of nodal membranes together so that the nodes of one membrane are secured to the midpoint area between the nodes of the other membrane.

(6) Securing pairs of anticlastic membranes together in which the nodes of one of the membranes have face diameters which are essentially equal to or less than the internal face diameters of the nodes of the mating membrane and are secured therein.

These as well as further objects will become apparent from the consideration of the following specification as related to the drawing in which:

FIG. 10 is a cross section of a sandwich structure embodying the core shown in FIG. 9 and illustrating the employment of a compressive filler material in the openings between said membranes;

FIG. 11 is a cross section of a sandwich panel illustrating a further embodiment of my invention wherein a pair of anticlastic membranes have their internally disposed nodes secured at the zero axis of deformation of the other membrane;

FIG. 12 is a partly sectional perspective fragmentary view of a sandwich structure of still a further embodiment of my invention showing additional details in phantom, and FIG. 13 is a section taken on the line 13—13 of FIG. 12.

Figure 1:
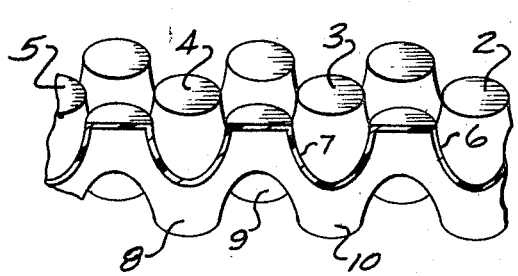
FIG. 1 is a partly sectional perspective view of an antielastic membrane of my invention.
Figure 2:
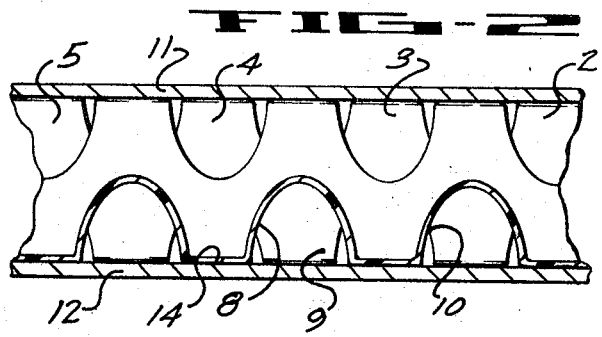
FIG. 2 is a cross section of the anticlastic membrane of FIG. 1 forming the core material for a sandwich panel.

Referring now in detail to the drawings and particularly to FIGS. 1 and 2 thereof, it will be seen that the membrane 1, which may be constructed of plastic, metal or other suitably deformable material, has a plurality of nodes projecting from each surface thereof. All adjacent nodes, including nodes 2, 3, 4 and 5, are on straight line axes intersecting each other. The nodes 3, 6 and 7 are formed in a triangular pattern such that the apex of each of these nodes also constitutes the vertex of an equilateral triangle.

A similar plurality of nodes exemplified by 8, 9 and 10 are formed in the membrane and project in an opposite direction from the nodes 2 through 7. Each node, such as node 9, is disposed adjacent to a node such as nodes 3, 4 and 7, which project in an opposite direction. The diameter of the face of each node in this form of my invention is at least equal to one half the distance between the axes of adjacent nodes. The resultant structure comprises a plurality of essentially paraboloidal forms wherein the bending moments about topological Riemann lines are substantially reduced. If the distance between the axes of adjacent, opposed nodes is equal to or less than the sum of the diameters of such nodes, the strength of the structure is greater than it would otherwise be. This also results from the fact that a line truss structures otherwise formed. Such line truss is disposed 45° to the normal truss pattern. In FIG. 2, the anticlastic membrane 1 has a pair of face sheets 11 and 12 secured to the apices of the oppositely projecting nodes by a suitable adhesive, or, in the event the material of the panel is a metal, by brazing or resistance welding. In FIG. 2 it will be apparent that the apices of all the nodes projecting in one direction are in a common plane, and that each node, such as the node 10, has a planar surface 14.

Figure 3:
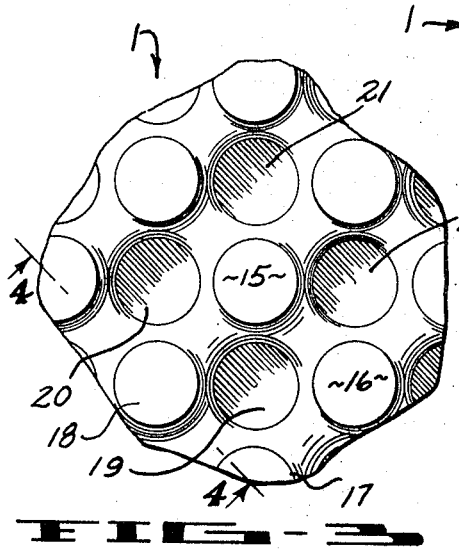
FIG. 3 is a top plan view of an anticlastic membrane of my invention in which the nodal pattern is a square.
Figure 4:
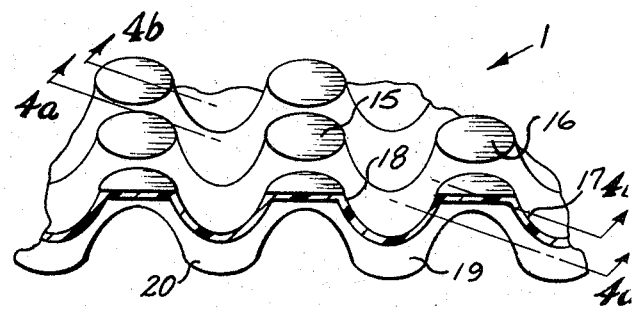
FIG. 4 is a partly sectional perspective view of the anticlastic membrane of FIG. 3.
Figure 4B:
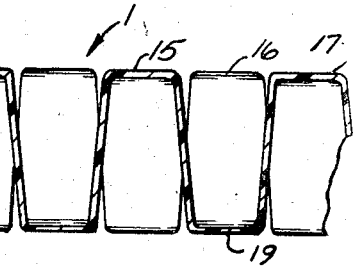
FIG. 4b is a cross sectional view taken along the plane indicated by 4b—4b in FIG. 4.
Figure 4A:
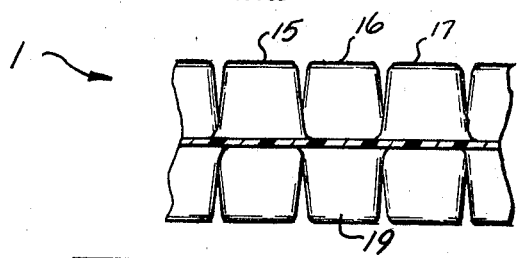
FIG. 4a is a cross sectional view taken along the plane indicated by 4a—4a in FIG. 4.

The embodiment of my invention illustrated in FIGS. 3 and 4 is essentially similar to that shown in FIGS. 1 and 2 except that the nodes, such as nodes 15 through 18, are disposed in a square pattern. Oppositely projecting nodes 19 through 22 are also disposed in the same pattern. FIGS. 4a and 4b clearly illustrate the rectilinear cross-section pattern achieved in the embodiment of FIGS. 1-4.

Figure 5:
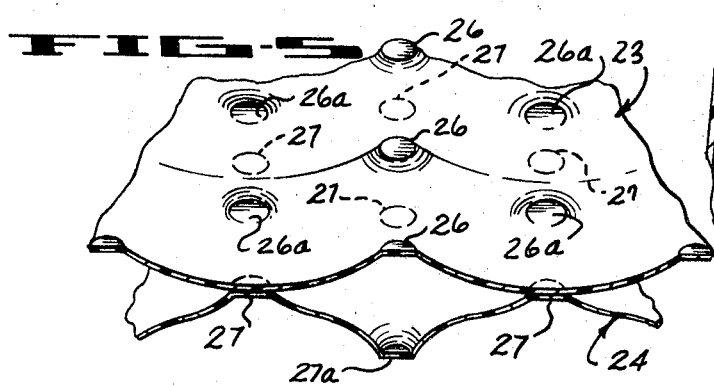
FIG. 5 is a partly sectional perspective fragmentary view of a pair of anticlastic membranes having the nodes projecting from one face of one of such membranes secured to the other membrane at a midpoint between its nodes.

In the embodiment of my invention illustrate in FIG. 5, the sandwich core material consists of a pair of anticlastic membranes 23 and 24. In this form of my invention, the anticlastic membranes 23 and 24 are only similar in that the nodal pattern is square in form. All of the upwardly projecting nodes, as for example nodes 27 of membrane 24, are secured by an appropriate adhesive in the case of plastic or by soldering or welding in the case of metal, to the upper membrane at an intermediate point between the nodes 26 of membrane 23. In this structure, the distance between adjacent upwardly projecting nodes 27 in the membrane 24 is one-half of the square root of 2 times the distance between adjacent downwardly projecting nodes 26a of membrane 23. This results from the fact that in the square pattern the side of the square shape generated at the neutral plane (the original plane of the sheet from which the anticlastic membrane is formed) is one-half of the square root of 2 times the side of the square generated at the nodal apices of this membrane.

Additional anticlastic membranes can be added to the structure of FIG. 5, but each such membrane will have a node spacing which is one-half of the square root of 2 times the node spacing of the immediately adjacent membrane.

Figure 6:
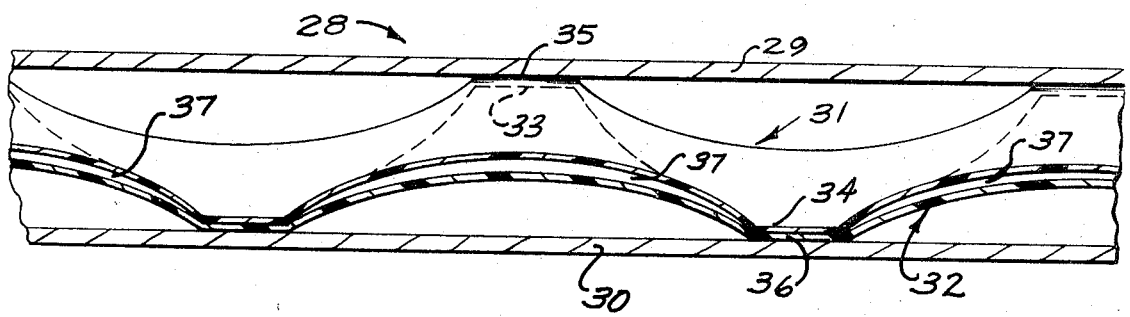
FIG. 6 is a section of a further sandwich structure embodiment of my invention illustrating the employment of a pair of anticlastic membranes secured at their nodes and having a pair of face sheets adhered to opposite sides of the core.

In FIG. 6, the sandwich panel 28 is composed of a pair of face sheets 29 and 30 to which a pair of anticlastic sheets or membranes 31 and 32 are secured. In this embodiment of my invention the membranes 31 and 32 are identical in form; the nodes projecting in one direction from each of these sheets having an apex 33 and 34 which is of a lesser area and diameter than the apex of the nodes 35 and 36. The space 37 between the membranes 31 and 32 can, if desired, be filled with a polyurethane foam or the enclosed space between the two sheets can be pressurized with gas or other fluids thereby substantially improving the structural value of the core. Core panels constructed in this manner have excellent structural qualities in flexure because the material used to fill the space between the sheets is essentially in compression. In flexure, the core space has a tendency to reduce its volume. Consequently, flexural stresses are transmitted throughout the core structure.

Figure 7:
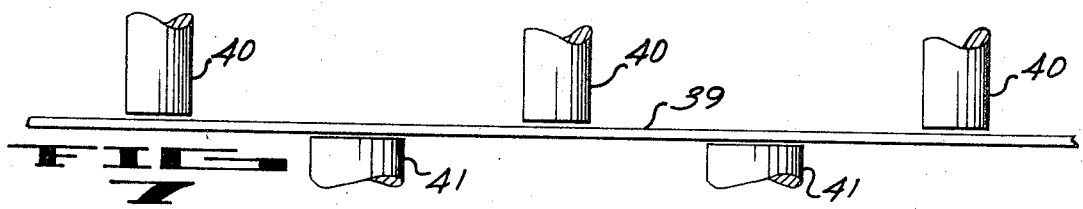
FIG. 7 is a schematic side view of a uniplanar sheet about to be formed in accordance with a method of my invention by a plurality of oppositely directed forming pins.
Figure 8:
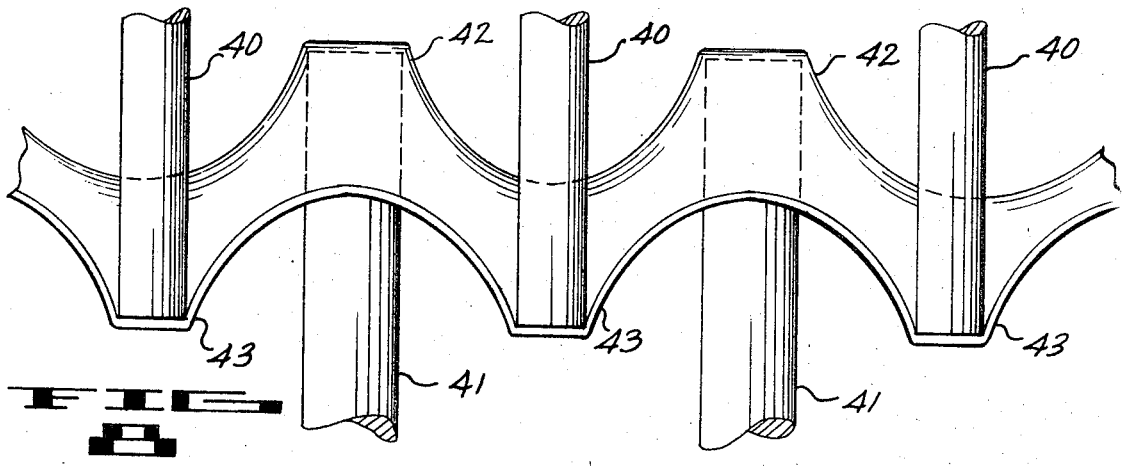
FIG. 8 is a schematic side view similar to that of FIG. 7 illustrating the uniplanar sheet of FIG. 7 in its final forming stage.

A simple method for construction of the anticlastic membrane of my invention is illustrated in the chronological sequence illustrations of FIGS. 7 and 8. The flat sheet 39 to be formed to placed between a series of oppositely disposed die pins 40 and 41. The pins 40 are all disposed on one side of the flat sheet 39 to be formed, while the pins 41 are disposed on the opposite side of this sheet. The sheet will, of course, be heated to forming temperature either prior to insertion between the pins 40 and 41 or after such insertion. The sheet is supported in a suitable frame during the forming period. The pins 40 and 41 are then urged towards each other to the depth of draw desired for the sheet 39 to provide the oppositely disposed series of nodes 42 and 43 as shown in FIG. 8. The sheet is thereafter permitted to cool sufficiently to retain its shape and the dies withdrawn to their original positions spaced apart sufficiently to permit the formed sheet 39 to be withdrawn.

Depending upon the type of material desired to be formed, alternative methods may be employed to form the anticlastic membranes of my invention. For example, a modification of the foregoing method employs the utilization of contour control sheets. In the event that the anticlastic membrane is to be formed from a thermoplastic material, the control sheets can be of suitable elastomers such as silicone rubbers, which will withstand the temperatures required to raise the sheet to be constructed to its forming temperature. In this method of my invention, a contour control sheet which has a predetermined elasticity so as to achieve a particular desired depth of section in the finished member is placed on each side of the sheet to be formed and the resulting sandwich is placed in a tension frame to rigidly hold the three sheets in position. The thermoplastic or thermosetting sheet to be formed is elevated to forming temperature either prior to or after being placed between the contour control sheets. The control sheets are then drawn along with the membrane to the limits of the control sheet elasticity whereby (as determined by the preselected control sheet elasticity characteristics) the membrane in the truss planes will at all points have an essentially straight line configuration as shown, for example, in FIGS. 4a and 4b. The remaining steps of this method are identical to those described with respect to FIGS. 7 and 8.

Still a further method of my invention, which is especially well suited to the construction of anticlastic membranes having deeper nodal sections of essentially constant wall thickness, without excessive reduction in the cross section of the membrane sheet in the critical highly stressed areas, utilizes the anticlastic membrane produced as in accordance with FIGS. 7 and 8. The membrane so formed is thereafter placed in a die identical to the finishing die except that the diameters of the forming pins (similar to the pins 40 and 41) are larger and are provided with hemispherical ends as contrasted with the flat ends of the dies shown in FIGS. 7 and 8 and the finishing dies. These forming dies are then urged in opposite directions to form the membrane to approximately 80% of the depth of the finished product. The thus formed sheet is cooled, removed from the intermediate forming dies, placed within the final forming die structure (similar to that shown in FIGS. 7 and 8), heated to forming temperature and then drawn to its final form. It is cooled and finally removed from the final dies. The employment of this latter method permits the formation of anticlastic membranes having much deeper nodal sections with thinner constant wall sections than is generally otherwise possible.

Referring again to FIG. 8, the nodes 42 of the anticlastic membrane 39 of larger face diameter than the corresponding dimension of the adjacent oppositely directed nodes 43. As a consequence, the topological Reiman zero lines of the so formed node patterns are parallel to one another and do not lie in the mid-level plane of the structure. The hings effect is thereby substantially diminished.

Figure 9:
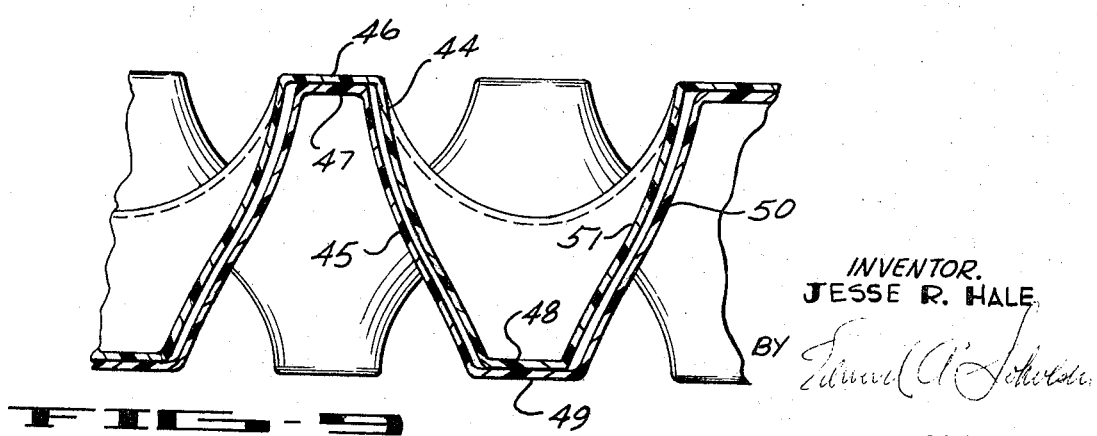
FIG. 9 is a sectional view of still a further embodiment of my invention illustrating a pair of anticlastic membranes secured together at their nodes and wherein the nodes projecting from one side of each of said sheets have a smaller apex diameter than the nodes projecting from the other side of said sheets.

In FIG. 9 is illustrated still another form of core material of my invention. In this embodiment, the anticlastic membranes 44 and 45 are adhered to one another at the node apices 46 and 47, and 48 and 49. The apex 47 of membrane 45 is smaller in cross sectional area than the area of the internal apex 46 of membrane 44. Similarly the area of the apex 48 of sheet 44 is smaller in cross sectional area than the apex 49 of membrane 45. These sheets are so formed that adjacent node walls, as for example walls 50 and 51, can be spaced apart in order to provide a plenum which can be filled with compression material as hereinabove described, or these walls can be essentially in contact and if desired adhered to one another. FIG. 10 illustrates the core material of FIG. 9 to which the face sheets 52 and 53 are secured. In addition, the plenum or space between the sheets 44 and 45 is illustrated as being filled with a compression material 54. In the structures of FIG. 9 and FIG. 10 the node sections of the membrane sheets are in male-female relationship.

FIG. 11 illustrates a further sandwich panel of my invention. In this embodiment, the anticlastic membranes 55 and 56 are adhered to one another such that the apices 57 of the membrane 55 are adhered to the antinodes 58 of membrane 56, while the nodes 59 of the membrane 56 are adhered to the antinodes 60 of the membrane 55. The nodes 62 and 63 of membranes 55 and 56, which form the opposed bearing surfaces of the so formed structural core material, are adhered to face sheets 64 and 65.

The sandwich structure illustrated in FIGS. 12 and 13 embodies a single anticlastic membrane 68, which illustrates still a further embodiment of my invention. In this form, the nodes 69 have counter nodes 70 formed in a reverse direction in them. These counter nodes 70 have apices 71 which are of a depth equal to the depth of the nodes 72 and are oppositely directed from the nodes 69. The latter nodes 72 also have counter nodes 73 whose apices 74 are formed to a depth equal to the depth of nodes 69. The anticlastic membrane of this embodiment of my invention can be secured to a similar membrane or to the membranes of the other embodiment in the manner described above.

Face sheets 75 and 76 are secured to the core of this form of my anticlastic membrane.

It will be evident that the structural core materials and panels of my invention may be constructed of any suitably deformable material. Thermoplastics such as the acrylic, polystyrene, acetal, chlorinated polyether, polyamide, cellulose, polyethylene, polyvinyl chloride, polyphenelene oxide, polysulphone, acrylic butadiene styrene, polyurethane resins may all be used. Thermosetting resins reinforced with glass fibers or other fabrics can similarly be employed. Metal structures made of aluminum, steel, titanium and other suitable metals are similarly useful in the core structures of my invention. The structural core may be joined to itself and to facing sheets by employment of resin bond methods, selfbonding, welding, riveting, and other conventional techniques. It is also possible to employ different types of materials in the same structure in order to obtain the desired structural characteristics.

Although my invention has been disclosed with specific reference to core structures having triangular or square node patterns and circular node bearing surfaces, it will be evident that other patterns and forms can be employed without departing from the scope of my invention.

While the method and device of this invention have been described and illustrated in detail, it will be understood that the foregoing specification and drawings are by way of illustration and example only and are not to be taken by way of limitation, the spirit and scope of my invention being limited only by the terms of the following claims.

I claim:

1. A core material forming a truss comprising a unitary anticlastic sheet having a first plurality of uniformly shaped essentially paraboloidal nodes projecting transversely from one face of said sheet and a second plurality of uniformly shaped essentially paraboloidal nodes projecting transversely from the opposite face of said sheet, each of said nodes diminishing in cross sectional area as a function of the distance of projection from the zero plane of deformation of said sheet, the face diameter of each of said nodes, the distance between adjacent ones of said nodes and the depth of the nodes being such that any cross section running through the nodes in a plane parallel to the truss planes has an essentially rectilineaer configuration.

2. The material of claim 1 wherein the diameter of each of said nodes is at least equal to one half of the distance between adjacent ones of said nodes.

3. The core material of claim 1 in which the apices of adjacent nodes of each of said first and second plurality of nodes define triangular patterns.

4. The core material of claim 1 in which the apices of adjacent nodes of each of said first and second plurality of nodes define square patterns.

5. The core material of claim 1 in which adjacent nodes are of different diameter.

6. The core material of claim 1 in which each of said first and second plurality of nodes have counter nodes formed therein, said counter nodes extending in depth to a plane defined by the apices of the oppositely extending nodes.

7. The core material of claim 6 which further comprises a pair of opposed parallel face sheets secured to the opposite faces of said core material.

8. The core material of claim 1 which further comprises a second sheet having a first plurality of uniformly shaped nodes projecting transversely from one face of said sheet and a second plurality of uniformly shaped nodes projecting transversely from the opposite face of said sheet, each of said nodes diminishing in cross sectional area as a function of distance from the plane of said sheet, and the face diameter of each of said nodes being at least equal to one half of the distance between adjacent ones of said nodes, said second sheet being adhered to said unitary sheet.

9. The core material of claim 8 wherein said first and said second plurality of said nodes of said second sheet are secured to said unitary sheet at the anti-nodes disposed at the midpoints between adjacent nodes of said unitary sheet.

10. The core material of claim 8 which further comprises a pair of face sheets adhered to opposite sides of said core material to the oppositely disposed nodes thereof.

References Cited
UNITED STATES PATENTS

| | | | |
|---|---|---|---|
| 1,032,789 | 7/1912 | Swift | 161—135 |
| 1,360,142 | 11/1920 | O'Brien | 16—134 X |
| 2,481,046 | 9/1949 | Scurlock | 161—137 X |
| 2,792,164 | 5/1957 | Cauffiel | 52—615 X |
| 2,996,417 | 8/1961 | Wilson | 161—127 X |
| 3,013,641 | 12/1961 | Compton | 161—127 |
| 3,227,598 | 1/1966 | Robb | 161—161 X |
| 3,313,080 | 4/1967 | Gewiss. | |
| 3,342,666 | 9/1967 | Hull. | |
| 3,389,748 | 6/1968 | Hitchens. | |
| 3,444,034 | 5/1969 | Hewett | 161—130 X |
| 2,689,988 | 9/1954 | French | 161—127 X |
| 2,809,908 | 10/1957 | French | 161—127 X |
| 2,858,247 | 10/1958 | De Swart | 161—137 X |
| 3,086,899 | 4/1963 | Smith et al. | 161—131 X |
| 3,151,712 | 10/1964 | Jackson | 52—615 |
| 3,197,357 | 7/1965 | Schulpen | 161—130 X |
| 3,279,973 | 10/1966 | Arne | 161—131 |

ROBERT F. BURNETT, Primary Examiner

W. W. SCHWARZE, Assistant Examiner

U.S. Cl. X.R.

52—618; 161—69, 127, 131